US007602924B2

(12) United States Patent
Kleen

(10) Patent No.: US 7,602,924 B2
(45) Date of Patent: Oct. 13, 2009

(54) REPRODUCTION APPARATUS WITH AUDIO DIRECTIONALITY INDICATION OF THE LOCATION OF SCREEN INFORMATION

(75) Inventor: Martin Kleen, Neunkirchen (DE)

(73) Assignee: Siemens Aktiengesellschaft, Munich (DE)

( * ) Notice: Subject to any disclaimer, the term of this patent is extended or adjusted under 35 U.S.C. 154(b) by 1177 days.

(21) Appl. No.: 10/922,319

(22) Filed: Aug. 20, 2004

(65) Prior Publication Data
US 2005/0047624 A1 Mar. 3, 2005

(30) Foreign Application Priority Data
Aug. 22, 2003 (DE) ................. 103 38 694

(51) Int. Cl.
*H03G 3/00* (2006.01)
(52) U.S. Cl. .......................... 381/61; 381/124; 381/306
(58) Field of Classification Search ................ 381/300, 381/306, 333, 388, 61, 310, 124, 56, 58; 463/35
See application file for complete search history.

(56) References Cited

U.S. PATENT DOCUMENTS 5,291,556 A * 3/1994 Gale ............................ 381/17
5,636,283 A * 6/1997 Hill et al. ...................... 381/17
6,477,256 B1 * 11/2002 Stoehr ......................... 381/306
6,522,763 B2 * 2/2003 Burleson et al. ............. 381/189
6,535,610 B1 * 3/2003 Stewart ........................ 381/92
6,882,335 B2 * 4/2005 Saarinen ..................... 345/156
6,977,653 B1 * 12/2005 Cleary et al. ................ 345/440
7,386,140 B2 * 6/2008 Ogata .......................... 381/310
2003/0156075 A1 * 8/2003 Motoyama et al. .......... 345/1.3
2006/0227985 A1 * 10/2006 Kawanami .................. 381/306

FOREIGN PATENT DOCUMENTS

| DE | 42 39 200 A1 | 5/1993 |
| DE | 690 27 735 T2 | 11/1996 |
| EP | 0 426 272 B1 | 5/1990 |

OTHER PUBLICATIONS

"Multi-Channel Audio Device for Graphics Workstation" IBM Corp 1987, Aug. 1987, vol. 30, Nr. 3 pp. 1369-1370.

* cited by examiner

*Primary Examiner*—Xu Mei
(74) *Attorney, Agent, or Firm*—Schiff Hardin LLP

(57) ABSTRACT

A reproduction device has at least one screen for displaying information, with at least four sound reproduction devices respectively at the corners of the screen, which are separately driven depending on the local screen position of a user-relevant item of information such that direction information relating to the screen information is conveyed to the user by the resulting acoustic signal that is produced by the combined, individual driving, which is perceivable by the user.

15 Claims, 4 Drawing Sheets

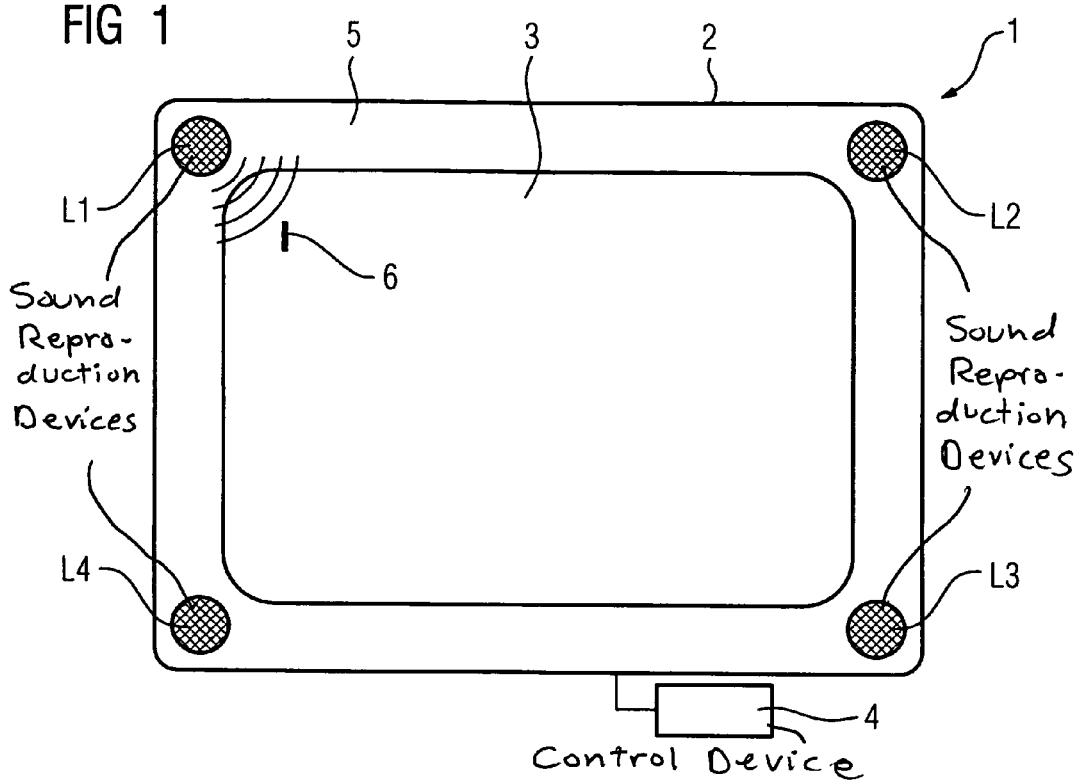
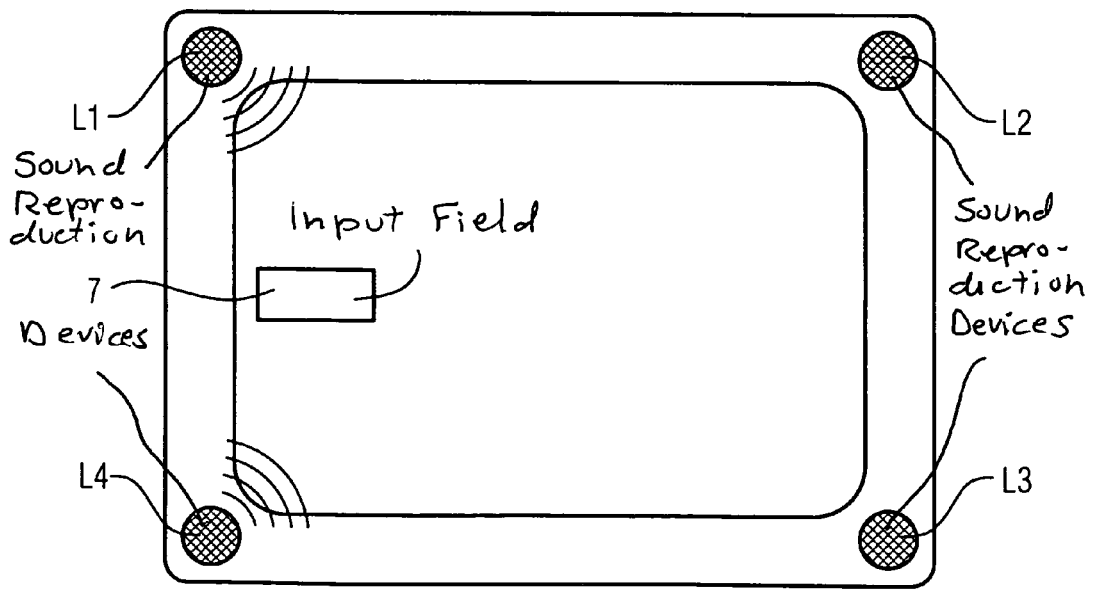

REPRODUCTION APPARATUS WITH AUDIO DIRECTIONALITY INDICATION OF THE LOCATION OF SCREEN INFORMATION

BACKGROUND OF THE INVENTION

1. Field of the Invention

The present invention concerns a reproduction apparatus comprising at least one screen to show information.

2. Description of the Prior Art

Reproduction apparatuses having at least one screen or a display in the form of a screen are well known and are used in the most varied application fields. such an apparatus can be, for example, a computer screen for a computer and serve to display information provided by the computer. It is also possible for the reproduction device to be part of a larger system and to output information that serves the system control. It is also possible for it to be part of an information or security system such as, for example, an air traffic controller system, with relevant information concerning air traffic being shown on it. This is only a portion of the application possibilities where a reproduction apparatus (thus a screen or a monitor) can be used.

Furthermore, it is known to associate sound reproduction devices with a monitor. Thus, for example, an audio system for a computer screen is specified in European Application 0 426 272, in which a number of speakers are distributed around a display unit, whereby a sound source signal is supplied to the speakers variably with regard to the amplitude or phase, while an image is displayed that refers to a sound source on a screen. A special region of the screen is dedicated to this image, this region having coordinates that are processed, whereupon a sound is generated that appears to emanate from a position with a predetermined relationship to the position of the image. Furthermore, an active speaker box for computer systems is known from German OS 42 39 200 that has a pedestal arranged under a monitor, in which the speakers are disposed.

Information of any type is shown to the user on the screen, meaning information in written form, in the form of a field in which something is to be entered, in the form of symbols or, for example, in the form of the cursor or the mouse pointer. During work on the screen, a problem is that the operator always loses eye contact with the "input focus", thus the region on which user-relevant screen information is displayed to him or her. For example, the location of the working document on which the user was working until recently and on which, for example, the cursor is blinking, or the field of a form to be processed or the like that is currently shown on the screen and which will or must receive the next input, is understood as such an "input focus". This means that the user relatively quickly loses orientation as to where relevant local screen information is displayed, where the user has to make inputs, etc. Optical signal information that signals a specific situation to the user is also understood as screen-relevant user information. For example, given the use of a reproduction apparatus to control a system, this user-relevant information can be a blinking of a symbol or the like that demands a corresponding action, whereby the user is notified of a danger situation or the like. If the user is inattentive or overtired, etc., the user will not perceive this information.

It is known (in particular in the case of a cursor) to visualize relevant information or displays by rhythmic blinking, and thus to focus the attention of the user thereon. It is also known, for example, to optically emphasize, by an intensive coloring or the like, fields at which an input has to ensue. Nonetheless, these indications given to the user are such that they always require increased attention by the image viewer so that the viewer notices the indication and can orient himself or herself, so that the viewer recognizes that something is to be done and where an input must be made. However, a considerable risk is connected with this, in particular in sensitive, critical application fields. If, for example in the context of system controls, specifically power station control, a user were to react too late to displayed information that required action, this can lead to far greater difficulties. A further example involving a risk is, for example, air traffic monitoring where, for example, two airplanes located on a collision course are optically displayed on a screen; but if the user reacts too late, a possible collision cannot be prevented.

The aforementioned problems increase exponentially when the reproduction apparatus comprises not only one screen, but (as is increasingly common) two or more screens are arranged next to one another and/or one atop the other forming a screen row or screen array on which either contiguous information is shown in the fashion of a large screen, or separate items of information are displayed. The screen information is immense; the demands on the user increase considerably.

SUMMARY OF THE INVENTION

An object of the present invention is to provide a reproduction apparatus that enables simple, fast and secure recognition of user-relevant screen information.

This object is achieved in accordance with the invention by a reproduction apparatus of the previously described type, having at least four sound reproduction devices that are or can be respectively associated with the corners of the screen, the sound reproduction devices being separately driven dependent on the local screen position of user-relevant screen information such that direction information relating to the defined screen information can be given to the user by the resulting acoustic signal that is produced by the combination of the individual driving, which is perceivable by the user.

The invention provides an acoustic information presentation that is suitable to give the user, who is sitting in front of the reproduction device of whatever design, acoustic direction information as to the physical location on the screen or on the screens where currently displayed user-relevant screen information is shown. For this purpose, at least four sound reproduction devices (preferably speakers) are provided that are separately activated (supplied) via a control device controlling the screen, for example a corresponding computer, processor etc. This means that each sound reproduction device can independently emit sound or a tone. The activation ensues dependent on the local screen position of the user-relevant user information, with the user (viewer) being informed of the relevance of the respective screen information (i.e. the fact that it is relevant information) as well as its local position, both of which are known to the control device controlling the sound reproduction devices, so that this information is embodied in the sound or tone produced by the combined individual drives of the sound reproduction devices.

Dependent on the local screen position of the user-relevant information, the individual speakers are activated such that they emit louder or softer tones or no tones. The user who sits in front of the reproduction apparatus perceives a superimposed acoustic signal that results from the individual signals of the individual speakers. When the speakers have been driven dependent on position and emit sounds at different volumes, insofar as the screen information is displayed off-center, the speaker or speakers positioned nearer to the screen information are emit tones louder than those removed therefrom. The user thus perceives the resulting signal as coming from a specific direction. Acoustic direction information relating to the screen position of the screen information thus is provided to the viewer immediately, such that the viewer can immediately orient himself or herself as to where the relevant information is on the screen, and can find it significantly faster and detect its information content. This advantageous orientation assistance is more beneficial the larger the screen, particularly if the reproduction apparatus is composed of a number of screens in total.

It is thus possible to remedy the previously cited problems with particular advantage. The user (for example an air traffic controller) in every case receives acoustic direction information regarding screen events relevant to the viewer. If, for example, two aircraft are shown on a screen or a screen array that are on a collision course, this is acoustically communicated to the user with specification of a direction as to where this relevant information is positioned on the screen, such that the viewer can immediately orient himself or herself and can recognize and react to the danger situation. Even in the case of simply locating a cursor or the like, however, the invention is appropriately usable, in particular, for example, when two or more screens are arranged next to and/or atop one another and the cursor can be moved from screen to screen.

As noted, the sound reproduction device can be appropriately fashioned as a speaker, but any other sound reproduction device alternatively can be used as long as it can be individually activated and can emit an individual acoustic signal.

The sound reproduction devices are individually variable with regard to their volume in the context of the driving thereof, such that they can be exactly controlled and the resulting signal can be easily acoustically resolved.

As noted, any screen information that, in the context of its display, possesses generally or at least temporarily important information content for the user, can be considered as user-relevant screen information. In an embodiment of the invention user-relevant screen information can be selected by the user. The user can decide which information the user considers as relevant and would like to have acoustically "marked," for example in general the cursor or the mouse point.

Alternatively the user-relevant information can be selected automatically, for instance if the reproduction device is utilized in the context of system control or, as described above, air traffic control or where it should not be left up to the user to decide what he or she considers relevant and what she does not.

As described above, the inventive reproduction device can have only one screen. It is also possible for it to be formed by several screens arranged next to or across from one another, forming a row of sorts, with at least four sound reproduction devices allocated to them in the corners of the resulting row.

Besides this linear arrangement, a configuration of several screens adjacent and opposite one another in the form of a screen array is also possible, with one sound reproduction device arranged at least in every corner.

As described, an acoustic sound signal with sufficient resolution with regard to direction can be generated by utilizing only four speakers in the corners of the screen configuration. For finer directional resolution, at least one additional separately controllable sound reproduction device, particularly a speaker, can be provided. When a row shaped screen configuration is used, it is expedient to position a respective speaker in the middle of the long sides of the screen configuration. When a large screen array is provided, one additional speaker, or more depending on how large the array is, can be provided at the center of each of the four sides.

As described above, an acoustic signal containing direction information is inventively conveyed to the user. In an embodiment of the invention, the reproduction device can be calibrated by the user so that the acoustics can be individually adapted to the user. For this purpose, defined image information such as a cursor is displayed at predetermined screen positions, and the user can set the sound reproduction devices according to the respective position in order to vary the resulting acoustic signal. The predetermined defined screen information, e.g. the cursor, is moved into each corner of the screen or screen array so that it is immediately adjacent a sound reproduction device that is allocated to this corner. The user then sets the volume of only this one sound reproduction device appropriately so that the user can unambiguously recognize that the direction information indicates this position. The other three speakers would not be activated in that case because they are not needed. Identical steps are taken for each of the remaining corner positions. The respective volume associated with these extreme positions of an item of screen information is now optimally adjusted to the needs of the user, so that the acoustic information that is emitted when an arbitrary item of screen information is displayed at any intermediate position is naturally also optimized to the individual user.

The sound reproduction devices, e.g. the speakers, are expediently fixed to the screen or screen array, particularly on or in a screen housing or array housing or a stand containing the array. Alternatively, the sound reproduction devices can be portable devices that can be suitably positioned relative to the screen or screen array.

DESCRIPTION OF THE DRAWINGS

FIG. 1 is a schematic illustration of a reproduction device with a first screen display.

FIG. 2 shows the reproduction device of FIG. 1 with a second screen display.

DESCRIPTION OF THE PREFERRED EMBODIMENTS

Figure 3:
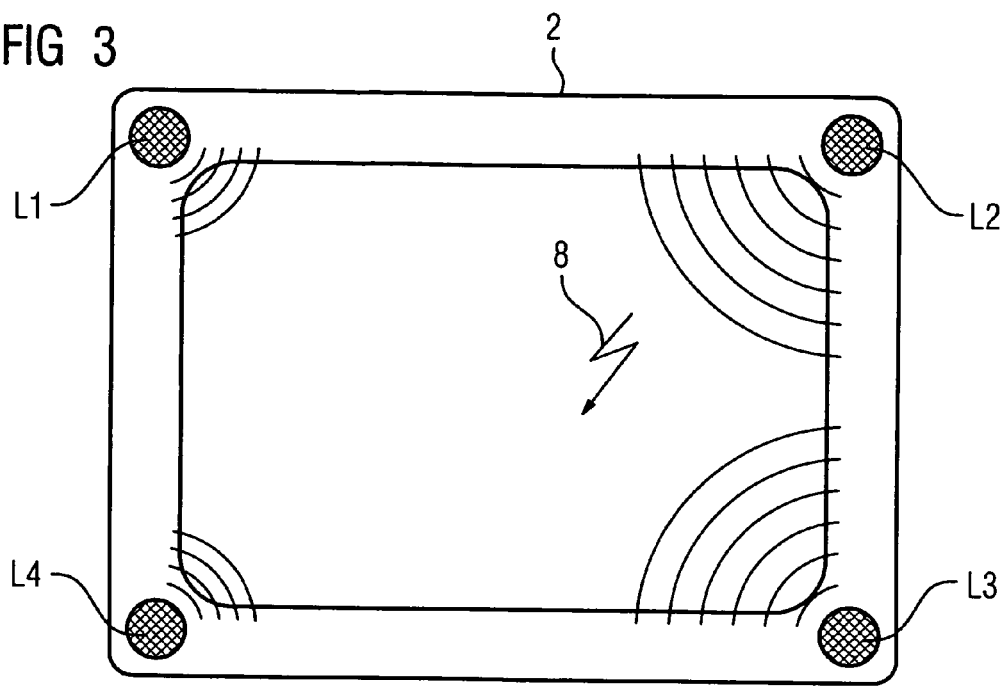
FIG. 3 shows the reproduction device of FIG. 1 with a third screen display.

FIG. 1 is a schematic representation of an inventive reproduction device 1 comprising a screen 2 at whose surface 3 arbitrary information can be reproduced. This occurs by means of a control device 4, which can take any form.

The screen 2 has four speakers L1, L2, L3, L4 that are each separately controlled with respect to sound generation by the control device 4, and that are permanently integrated in the screen housing 5 in this case.

In this embodiment, a cursor 6 is displayed on the surface 3 of the screen 2. This cursor 6 represents user-relevant screen information as defined by the user. Besides the possibility of letting the user define which image information is user-relevant, the control device 4 alternatively can automatically recognize screen information as relevant. This is appropriate particularly where critical information is displayed or where the reproduction device is utilized in a critical environment.

In that case, user-relevant information is defined in advance in the control device 4 so that the control device 4 can immediately detect such information when it is displayed.

The control device 4 controls the four speakers L1-L4 such that the resulting acoustic signal perceived by the user who sits in front of the reproduction device receives direction information regarding where on the screen 2, specifically on the surface 3, the user-relevant information is located.

In the example represented, the user-relevant information is the cursor 6. As in FIG. 1, it is displayed in the upper left position, i.e. closest to speaker L1. In order to acoustically notify the user, who is searching for the cursor because of other activities during which the user was not continuously monitoring the screen, where to find the cursor 6, only the speaker L1 is actuated to emit a tone by the control device 4. Speakers L2-L4 are silent. The user hears a sound signal coming from the top left corner of the screen and thus receives direction information as to where to find the cursor 6.

According to another possibility, this acoustic information is continuously emitted. To the extent that this is uncomfortable, another possibility provides for this acoustic direction information is emitted when there is no cursor movement for a predetermined period that can be set by the user, which indicates, for example, that the user has not looked at the screen for a longer period of time. This information can also be emitted when it is determined by means of a detection device (not shown) that the user has not looked a the screen for a long time, whereby, for that purpose, a small camera may be integrated on the housing side that has a suitable software based evaluation algorithm for the given image information, by means of which, for example, head movement and the eye position of the user are captured in the recorded image, and are detected and monitored. The acoustic information can be continuously emitted as a more or less loud tone but can also be emitted only once or intermittently at time intervals.

FIG. 2 represents another instance of a screen display and a resulting acoustic information presentation. FIG. 2 shows an input field 7 that has been defined as user-relevant either by the user or by the control device 4, into which the user has to enter suitable information. This can also be a dial key or button or the like.

In FIG. 2 this input field is disposed on the left margin of the screen surface 3 in the middle. The speakers L1 and L4 are driven by the control device 4, while speakers L2 and L3 remain silent. The user perceives a resulting acoustic signal that is emitted as a superimposed total signal from the middle of the left side of the screen. her attention is thereby averted immediately to this screen area.

It should be noted at this point that the respective volumes can be calibrated by the user. To that end, the cursor 6 is moved into each corner of the screen surface 3 with respect to the view in FIG. 1. The user now sets the respectively adjoining speaker so that the user hears it sufficiently and receives optimal direction information. Based on this calibration, the resulting total signal is individually optimized to the user's hearing even with respect to screen information that is not in one of the extreme positions of the corners.

FIG. 3 represents another possible screen display. Here, danger information 8 is displayed on screen 2, namely by a lightning symbol. This is located at a distance from the center of the screen more toward the right margin but is not displayed in the margin position. The control device 4 now drives the two speakers L2 and L3 to emit a relatively loud signal compared to the two speakers L1 and L4, which are simultaneously driven but send a substantially quieter signal. This is represented by the correspondingly large or small sound waves. The resulting total signal formed from the four tones of the speakers L1-L4 now has a directional bias toward the right side of the screen, but also a sound component coming from the left. The acoustic direction information perceived by the user indicates to the user that the relevant screen information is located in the right half of the screen at middle height.

Figure 4:
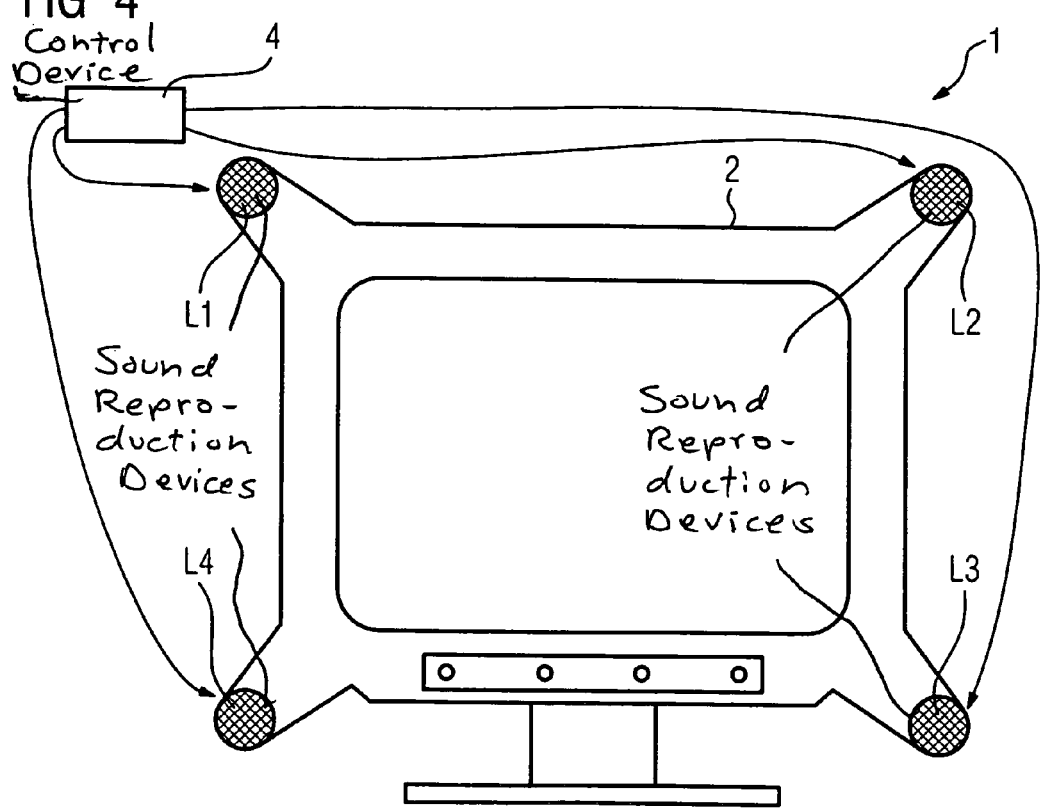
FIG. 4 illustrates another embodiment of the inventive reproduction device.

FIG. 4 represents an alternative embodiment of a reproduction device 1 consisting of a screen 2 in whose housing 3 speakers L1-L4 are integrated. However, the housing 3 is laterally elongated in the corner regions so that the speakers L1-L4 are farther apart than in the embodiment according to FIG. 1-3. As a result, the resulting acoustic total signal can be resolved somewhat better with respect to the direction information because the individual tones are sent from points situated farther apart from one another.

Figure 5:
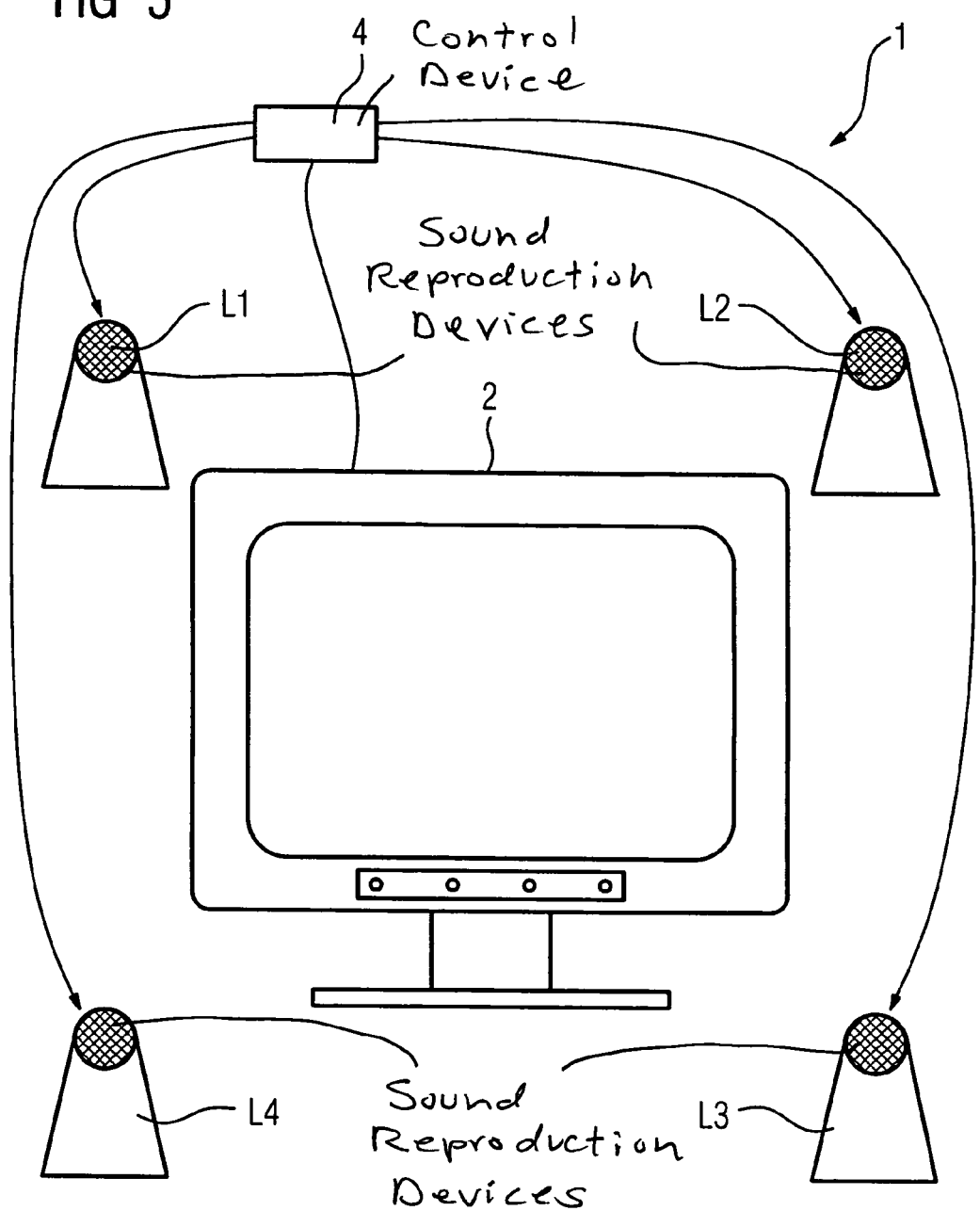
FIG. 5 illustrates a third inventive embodiment of a reproduction device.

FIG. 5 represents another embodiment of a reproduction device 1 having a screen 2, whereby in this case the sound reproduction devices, the speakers L1-L4, are realized as separate speakers that can be moved relative to the screen 2 and correspondingly positioned. They are also driven by the control device 4 that controls the screen 2.

Figure 6:
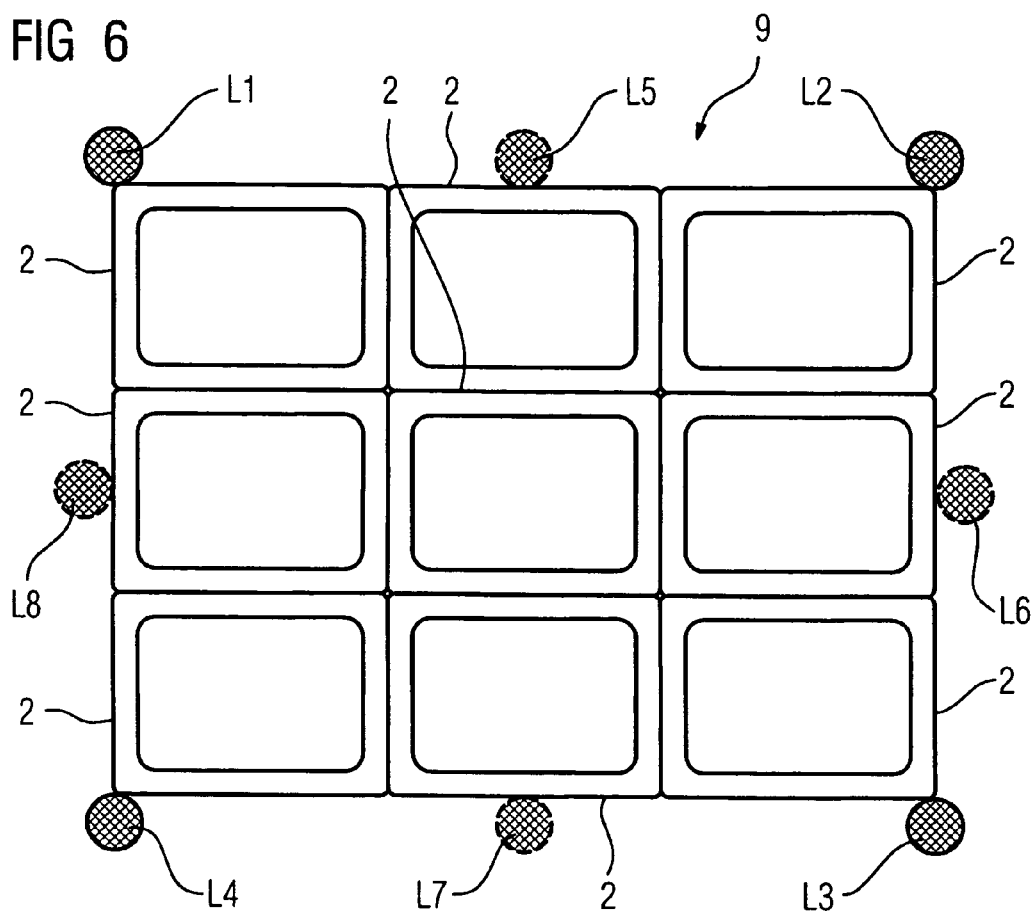
FIG. 6 illustrates a fourth embodiment of a reproduction device with several screens configured in an array.

FIG. 6 represents another inventive embodiment of a reproduction device 9 formed as an array of nine screens 2 mounted in a stand or the like (not shown). The display surfaces thereof form an overall display surface on which information can be displayed extending from screen to screen, or a separate independent item of screen information can be displayed at each screen 2. Four speakers L1-L4 are disposed in the corners here as well, by means of which the corresponding acoustic direction information signals relating to the relevant screen information that is displayed on the overall surface of the screen array can be emitted.

For improved resolution of the acoustics, particularly of the direction information, additional speakers L5, L6, L7, L8 can optionally be provided, which in the present example are disposed centrally at the respective longitudinal sides. These too are separately driven together with the speakers L1-L4 by means of the control device 4. In this manner, the direction information relating to the substantially larger display area that is impressed on the acoustic signal can have better resolution compared to the above described examples.

Figure 7:
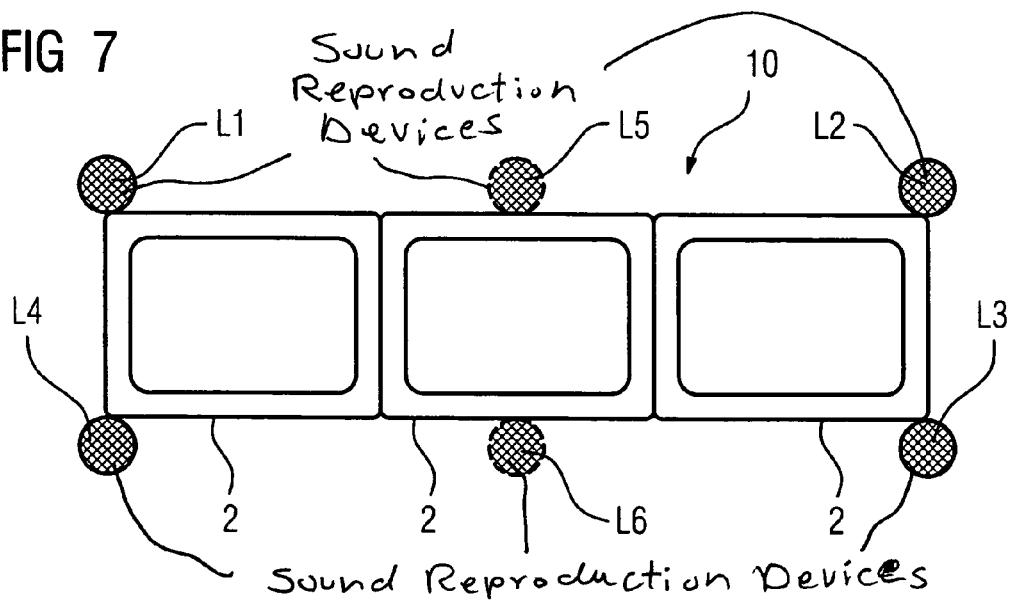
FIG. 7 illustrates a fourth embodiment of an inventive reproduction device with several adjacent screens.

FIG. 7 shows another embodiment of a reproduction device 10, having three adjacent screens 2 in this case. Four speakers L1, L2, L3, L4 are provided in the corners here as well. Additional speakers L5 and L6, represented by dotted lines, can optionally be positioned at the top and bottom longitudinal sides respectively. Each of the speakers L1-L6 can be separately driven by the control device 4.

The invention achieves a new sensory modality for informing the user with respect to user-relevant screen information that is displayed on the screen. This provides additional help to the user while improving the ergonomics and user friendliness of the device.

Although modifications and changes may be suggested by those skilled in the art, it is the intention of the inventor to embody within the patent warranted hereon all changes and modifications as reasonably and properly come within the scope of his contribution to the art.

I claim as my invention:

1. A reproduction apparatus comprising:
   at least one visual display at which a particular information item is sometimes displayed and sometimes not displayed at a location on the visual display and wherein said location changes while the information item is being displayed;
   at least four sound reproduction devices respectively disposed at corners of said visual display; and a control unit for individually driving said sound reproduction devices to control respective individual audio emissions therefrom to produce a combined, humanly perceptible collective audio emission having a directionality indicative of the changeable location of said information item on said visual display, said audio emission being present only when said information item is being displayed, and which is automatically activated when the information item is being displayed and is automatically deactivated when the particular information item is not being displayed.

2. A reproduction apparatus as claimed in claim 1 wherein said sound reproduction devices are speakers.

3. A reproduction apparatus as claimed in claim 1 wherein said sound reproduction devices are individually variable with regard to the volume of the individual audio emission therefrom.

4. A reproduction apparatus as claimed in claim 1 wherein said visual display comprises a single monitor screen having said corners.

5. A reproduction apparatus as claimed in claim 1 wherein said visual display comprises a plurality of monitor screens arranged in a screen array, said screen array having said corners.

6. A reproduction apparatus as claimed in claim 5 comprising an additional sound reproduction device disposed at one side of said array.

7. A reproduction apparatus as claimed in claim 5 comprising a plurality of additional sound reproduction devices respectively disposed at sides of said array.

8. A reproduction apparatus as claimed in claim 1 comprising a user interface connected to said control unit allowing calibration of said sound reproduction devices by a user to selectively set said individual acoustic emissions dependent on said location of said image information.

9. A reproduction apparatus as claimed in claim 1 wherein said sound reproduction devices are rigidly fixed to said visual display.

10. A reproduction apparatus as claimed in claim 9 wherein said visual display has a housing, and wherein said sound reproduction devices are integrated in said housing.

11. A reproduction apparatus as claimed in claim 1 wherein said sound reproduction devices are individually movable relative to said visual display.

12. An apparatus of claim 1 wherein said particular information item comprises danger warning information which is selectively displayed only when there is a danger present.

13. An apparatus of claim 12 wherein the danger present comprises a warning concerning a potential collision of airplanes.

14. An apparatus of claim 1 wherein said particular information item comprises absence of a visual display cursor movement for a predetermined period indicating that the user may not be looking at the visual display for said predetermined period.

15. An apparatus of claim 1 wherein said particular information item comprises a portion of the visual display which is selectively highlighted sometimes but not at other times.

\* \* \* \* \*